(12) United States Patent
Overbeck et al.

(10) Patent No.: US 8,970,583 B1
(45) Date of Patent: Mar. 3, 2015

(54) IMAGE SPACE STYLIZATION OF LEVEL OF DETAIL ARTIFACTS IN A REAL-TIME RENDERING ENGINE

(71) Applicants: Ryan S. Overbeck, San Francisco, CA (US); Janne Kontkanen, San Francisco, CA (US); Evan H. Parker, Atherton, CA (US)

(72) Inventors: Ryan S. Overbeck, San Francisco, CA (US); Janne Kontkanen, San Francisco, CA (US); Evan H. Parker, Atherton, CA (US)

(73) Assignee: Google Inc., Mountain View, CA (US)

( * ) Notice: Subject to any disclaimer, the term of this patent is extended or adjusted under 35 U.S.C. 154(b) by 337 days.

(21) Appl. No.: 13/632,857

(22) Filed: Oct. 1, 2012

(51) Int. Cl.
*G06T 17/05* (2011.01)

(52) U.S. Cl.
CPC ...................................... *G06T 17/05* (2013.01)
USPC .......................................................... 345/419

(58) Field of Classification Search
CPC ............................ G06T 17/05; G06T 2210/36
See application file for complete search history.

(56) References Cited

U.S. PATENT DOCUMENTS 5,999,187 A * 12/1999 Dehmlow et al. ............. 345/420
6,574,360 B1    6/2003 Berdardini et al.
2010/0066866 A1 * 3/2010 Lim ............................... 348/241
2013/0300740 A1 * 11/2013 Snyder et al. ................. 345/420
2013/0321399 A1 * 12/2013 Rohlf ............................ 345/419

OTHER PUBLICATIONS

Charalambos et al., "Optimized HLOD Refinement Driven by Hardware Occlusion Queries," ISVC (2007).
Game Development, "Optimizing Octree Rendering," (2012). Retrieved from the Internet on Oct. 16, 2012: URL:http://gamedev.stackexchange.com/questions/5612/optimizing-octree-rendering.
Gamedev, "Octree and Linked Lists," (1999/2012). Retrieved from the Internet on Oct. 16, 2012: URL:http://www.gamedev.net/topic/15890-otree-and-linked-lists/.
Tom's Hardware, "Octree and Ray Casting," (1999-2012). Retrieved from the Internet on Oct. 18, 2012: URL:http://www.tomshardware.com/reviews/voxel-ray-casting.2423-4.html.

* cited by examiner

*Primary Examiner* — Kee M Tung
*Assistant Examiner* — Ryan D McCulley
(74) *Attorney, Agent, or Firm* — Marshall, Gerstein & Borun LLP (57) ABSTRACT

When rendering a three-dimensional (3D) image, a render list is generated. The render list is sorted according to proximity to a notional camera, where each element of the render list specifies geometry and texture of a portion of the 3D image, and where at least two elements of the render list correspond to different levels of detail (LODs). The render list is then traversed twice: in the first instance, the render list is traversed to render each element in the render list to a respective texture, which includes applying a depth management technique to account for occlusion; in the second instance, the render list is traversed in a back-to-front order to render each of the textures to a display buffer to generate the 3D image, which includes applying an image space manipulation technique to at least some of the textures.

18 Claims, 7 Drawing Sheets

IMAGE SPACE STYLIZATION OF LEVEL OF DETAIL ARTIFACTS IN A REAL-TIME RENDERING ENGINE

FIELD OF DISCLOSURE

This disclosure relates to displaying 3D imagery on a computer display, and more specifically, to displaying 3D elements with differing levels of detail.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, digital maps of geographic areas are commonly displayed on computing devices, such as computers, tablets, and mobile phones via map applications, web browsers, etc. Many map applications provide the user with the ability to select the type of map information or features for viewing as well as to adjust the display of the digital map. For example, the user may select among several scales and map viewing modes, such as a basic map mode that presents a traditional road-map view, a satellite mode, a street-level mode, or a three dimensional (3D) view.

Some applications may generate 3D mesh data that describes the geometry of objects in a 3D space (e.g., vertices, edges), textures of surfaces, etc. In general, 3D mesh data may define 3D models of objects (such as buildings) at multiple levels of detail, so that an application can display a relatively coarse 3D model of an object in one view and a relatively detailed 3D model of the same object in another view.

Although providing 3D images can provide a significantly enhanced view of an area, the added requirements for data transmission speed and processing power can be problematic when attempting to provide a satisfying and seamless user experience. In some applications, particularly applications running on mobile devices, network connection or latency issues may create a situation where images must be drawn with incomplete data. For example, when a certain level of detail (LOD) is requested, but some or all of the required data for that LOD is not available, an image may be drawn or rendered using data intended for a different, coarser, level of detail. This often results in severe artifacts, or distortions of the requested 3D image, including easily noticeable distortions caused by hard edges of low-detail portions of a mesh.

SUMMARY

In an embodiment, a method for rendering a three-dimensional (3D) image is implemented in a computing device. The method includes generating a render list sorted according to proximity to a notional camera, where each element of the render list specifies geometry and texture of a portion of the 3D image, and where at least two elements of the render list correspond to different levels of detail (LODs). The method further includes, in a first instance, traversing the render list to render each element in the render list to a respective texture, including applying a depth management technique to account for occlusion. The method also includes, in a second instance, traversing the render list in a back-to-front order to render each of the textures to a display buffer to generate the 3D image, including applying an image space manipulation technique to at least some of the textures.

According to another embodiment, a method for presenting a 3D image is implemented in an electronic device having a processor, a general purpose memory, a display buffer memory used to drive a display, and a user interface for receiving instructions from a user. The method includes (i) determining, using the processor, a preferred level of detail for rendering the 3D image and a position of a notional camera, (ii) selecting, using the processor, nodes for rendering, each of the plurality of nodes containing 3D mesh data, such that at least one node at a level of detail lower than the preferred level of detail. The method further includes, in a first rendering operation, rendering each node in the selected set of nodes to a texture, with z-buffering, to place each textured node in a depth order. The method also includes, in a second rendering operation subsequent to the first rendering operation, rendering each textured node in a back-to-front order to the display buffer memory, where rendering each node to the display buffer memory comprises performing an image space manipulation on each node at a level of detail lower than the preferred level of detail.

According to another embodiment, a computing device includes one or more processors, a network interface to send and receive data via a communication network, a user interface to configured to display images and receive user input, and a computer-readable storage media coupled to the processor. The computer-readable storage media stores instructions rendering a 3D representation of a scene for a specified viewpoint and a preferred LOD. When executed on the one or more processors, the instructions cause the computing device to generate a render list sorted according to proximity to a notional camera, where each element of the render list specifies geometry and texture of a portion of the 3D image, and where at least two elements of the render list correspond to different LODs. The instructions further cause the computing device to traverse the render list, in the first instance, to render each element in the render list to a respective texture, including apply a depth management technique to account for occlusion. In the second instance, the instructions cause the computing device to traverse the render list in a back-to-front order to render each of the textures to a display buffer, including apply an image space manipulation technique to at least some of the textures, to generate the 3D representation of the scene.

In yet an embodiment, a method of presenting a three dimensional (3D) image on an electronic device includes providing an electronic device having a processor, a general purpose memory, a display buffer memory used to drive a display, and a user interface for receiving instructions from a user. The method includes determining, using the processor, a preferred level of detail for rendering the 3D image and selecting, using the processor, multiple nodes for rendering. Each of the plurality of nodes contains 3D mesh data, where at least one node is at a level of detail lower than the preferred level of detail. The method further includes rendering each of the nodes to a texture with z-buffering to place each textured node in a depth order, followed by rendering each textured node in a back-to-front order to the display buffer memory, where rendering each node to the display buffer memory includes performing an image space manipulation on each node at a level of detail lower than the preferred level of detail.

In still another embodiment, a computer-readable storage medium stores instructions executable by one or more processors of a computing device to perform a method of presentation of 3D images in a mapping application when data with varying levels of detail is present. The method includes receiving, via a user interface of the computing device, a request to generate a 3D image of a location from the mapping application, the request including a frustum of view at a preferred level of detail. Further, the method includes sending a request to a server for 3D mesh data related to the request. The method also includes receiving, from the server, 3D mesh data in an order of lower level of detail to higher level of detail and storing the three dimensional mesh data as it is received in data structure having nodes in a hierarchy of levels of detail. The method also includes traversing the data structure to select nodes of mesh data for rendering, starting at a coarse level of detail. In particular, the method includes removing nodes outside the view frustum, determining that a parent node has a level of detail that meets the preferred level of detail, selecting the parent node when its level of detail meets the preferred level of detail. When the parent node does not meet the preferred level of detail, the method includes visiting each child node of the parent node in an order of nearest to the camera to farthest from the camera. At each child node, the method includes determining whether data is present and, if no data is present at a child node, marking the parent node for use in rendering and processing a next node. When all nodes are processed and a selection of nodes is complete, the method continues with a first rendering pass, including rendering the selected nodes to a texture with z-buffering to develop occlusions within nodes and to place the nodes in a front-to-back z order. Then, in a second rendering pass, the method includes performing image space manipulation of one or more nodes having a lower level of detail than the preferred level of detail and rendering the nodes in a back to front order to render occlusions between nodes.

DETAILED DESCRIPTION

Overview

Using the techniques of the present disclosure, a computing device can efficiently generate an accurate and aesthetically pleasing image, such as a view of a geographic scene from a certain perspective of a notional camera, when some of the data at the required level of detail (LOD) is unavailable. The data can be, for example, mesh data that describes the geometry and textures of 3D models at various levels of detail.

In an example scenario, a rendering engine implemented in a computing device (which can be a client device such as a personal computer, a tablet computer, a smartphone, etc.) requests data for rendering a 3D image from a network server, and the network server provides the requested data in discrete portions, each specifying geometry and textures for a certain unit of space at a particular LOD. As the discrete portions of the data are received, the rendering engine stores the data in a spatial tree data structure. The rendering engine then uses the spatial tree data structure to generate an ordered render list in which list elements specify geometry and textures of portion of a 3D scene in view of the current position, orientation, magnification (zoom), etc. of the notional camera, for example. These and other factors determine the preferred LOD for the 3D scene (or, in some cases, preferred LODs for various parts of the 3D scene). However, because not all the data may be available at the computing device, some of the elements of the render list specify geometry and textures at an LOD lower than the preferred LOD. The elements specifying geometry closer to the notional camera are closer to the head of the render list than the elements specifying geometry farther away from the notional camera.

To reduce artifacts such as hard edges of low-detail geometry while maintaining correct occlusion, the rendering engine then traverses the render list in two passes: during the first pass, the rendering engine visits the elements of the render list in any order and renders each element to a respective texture and, during the second pass, the rendering engine visits the elements of the render list in a back-to-front order and renders the corresponding textures to the screen using an image space manipulation technique such as blurring, for example. In this elements farther from the notional camera do not occlude image elements closer to the notional camera, even when blurring is performed. When generating textures during the first pass, the rendering engine applies a depth management technique, such as z-buffering, according to one implementation. The rendering engine need not apply a depth management technique during the second pass (although the rendering engine may apply such a technique in some cases, such as when rendering roads or labels over a 3D representation of a terrain, for example).

In this manner, the rendering engine eliminates the requirement that complete data for an image be present at the beginning of the rendering process. In some real time applications, particularly in a mobile environment, the data required to render an image such as a 3D scene at a particular zoom level may not always be available. For example, a quick scene change or rotation around a point may require large amounts of data to complete a scene. Network congestion, server delays, I/O processor prioritization, etc. may leave the rendering engine with insufficient data to complete the rendering process at the requested LOD. In such as case, some regions may have to be rendered using data at an LOD lower than that requested. The rendering engine of the present disclosure can blur the elements at lower LODs to remove hard line artifacts and make the area less obtrusive when viewing without causing the blurred element to overrun a correctly rendered higher LODs or occlude other objects that should be in front of the blurred element.

Generally speaking, mesh data or other data for rendering 3D images can be divided into discrete portions according to any suitable principle. However, the examples below focus primarily on an octree, i.e., a data structure in which a node has up to eight children. Using an octree, a cubic unit of 3D space can be progressively divided into smaller cubic units (by dividing each side of the cube into two), with each node specifying geometry and textures for a particular cubic unit of space at a particular LOD. Thus, if a parent node stores geometry and textures at a certain LOD, its eight child nodes store geometry and textures for the corresponding eight units of space that make up the space of the parent node, but at a higher LOD. The octree may be organized so that nodes at the same level correspond to the same LOD.

When building the render list, the rendering engine traverses the octree from parent node to child nodes to first remove data outside the view frustum of the notional camera, then to determine whether the parent node has data at the requested LOD. When no data is present at the child node, the parent node is marked for use even though the parent node may not have the desired LOD.

Next, example techniques for rendering images using data at different LODs are discussed in more detail with reference to FIGS. 1-5. It is noted that although the examples of FIGS. 1-5 primarily concern 3D data in mapping applications, these techniques in general may be applied in a variety of applications (e.g., gaming, drawing) to various types of 3D or 2D data.

Example Method for Image Space Stylization of LOD Artifacts

The example methods of FIGS. 1 and 2 may be implemented as instructions stored on a computer-readable medium and executable in a computer system such as the one discussed with reference to FIG. 5. More generally, however, these methods may be implemented in any suitable computing device or a group of computing devices.

Figure 1:
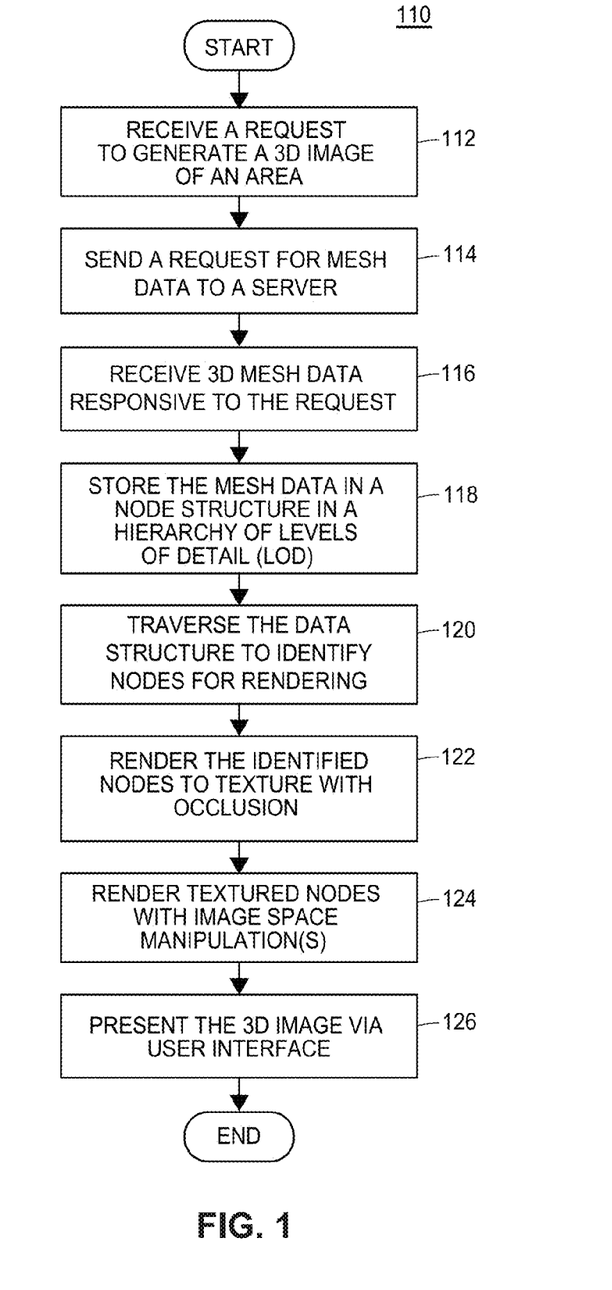
FIG. 1 is a flow diagram of an example method for image space stylization of LOD artifacts.

Referring first to FIG. 1, a method 110 is for image space stylization of LOD artifacts when data with varying levels of detail is present. The method 110 may be implemented, for example, on a computer-readable storage medium 52 having stored thereon instructions of a mapping application executable by a processor 50 of a computing device such as client device 14 (see FIG. 5). At block 112, a request may be received via an input device 54 that causes a mapping or 3D display application to request data for use in generating a 3D image. The request may be to generate a 3D image of a scene in a mapping application and may indicate a frustum of view of notional camera at a preferred LOD. The request may be responsive to a query in the map application, a change of map type, e.g., from a roadmap to a 3D view, zooming, panning, tilting, rotating, etc. The frustum of view may correspond to a camera location in three dimensions, a zoom level, and camera orientation parameters such as pitch, yaw, etc. or camera azimuth, camera tilt, for example. Related to the frustum, an LOD may be determined by the camera elevation and zoom level. Further, in some cases, a resolution of a display may impact the LOD.

At block 114, a request for mesh data related to the request is sent to a server (e.g., the server 12). Depending on the scenario and capability of the computing device, the request may be for specific data related to location or point of interest, or the request may simply relay a user's request for a change of map type or a camera move.

At block 116, the 3D mesh data may be received in response to the request. In an embodiment, the 3D mesh data is sent in an order of lower LOD to higher LOD. For example, building outlines may be sent before building color and window structure. This designation of zoom level corresponds to map zoom levels, where a low level, e.g., level 2 may include North America and zoom level 18 may show only a few blocks or less of a city.

The 3D mesh data may be stored as it is received in a spatial tree data structure having nodes in a hierarchy of levels of detail at a block 118. For example, the 3D mesh data may be stored in an octree, as discussed above. In other embodiments, other hierarchical data structures may be used, such as a quadtree. Other data structures may also be chosen, even non-hierarchical data structures, although some performance trade off may be made in view of perhaps another design consideration. In general, a suitable data structure allows the nodes to be sorted and subsequently stored in a strict front-to-back or back-to-front order, so that no geometry contained in node A can occlude any of the geometry contained in node B, should it be determined that node A is behind node B. Further, the suitable data structure allows geometry to be provided and stored at multiple levels of detail.

Each node may be rendered to a square with texture. Use of a convex octree ensures that no node can be both in front of and in back of another node. In an embodiment, 3D data is received in successively higher LODs, so that the data structure, such as the octree, is populated from coarse data to finer data for the region of interest.

However, because of network latency or network service interruptions, all of the data required for a given view at the desired LOD may not be available. To determine data availability, at a block 120, a rendering engine 62 or another suitable module begins traversing the data structure to select nodes of mesh data for rendering, starting at the coarse LOD.

Figure 2:
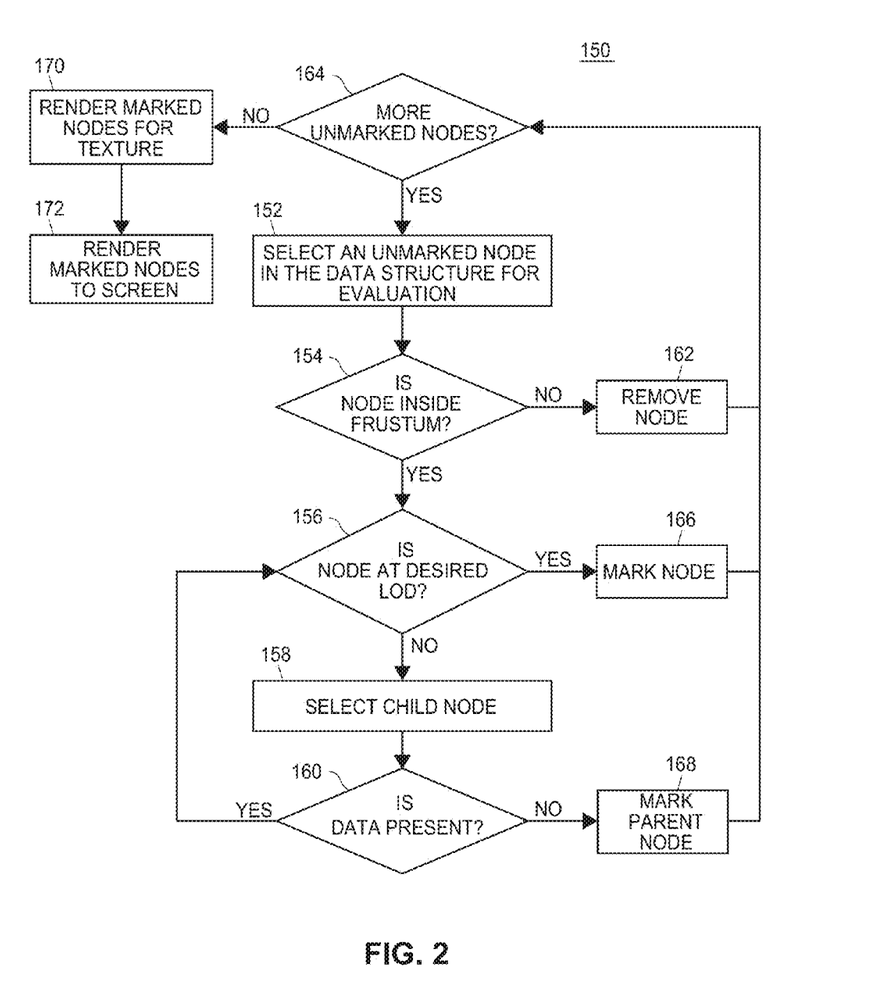
FIG. 2 is a flow diagram of node traversal and marking as may be used in the method illustrated in FIG. 1.

An example technique for traversing a spatial tree data structure and generating a render list is illustrated as a method 150 in FIG. 2. At block 152, traversing the data structure may begin by selecting an unmarked node for evaluation, particularly an unmarked node at a coarse LOD. At block 154, a test may be performed to determine whether the selected node is outside the view frustum. If so, the node may be removed at block 162 and a previously unmarked node may be tested at block 164. According to one implementation, a node is removed by being omitted from a render list.

If it is determined, at block 154, that the node is not outside the view frustum, the flow proceeds to block 156, where an additional test is performed to determine whether the selected node has data at the desired LOD. For example, an approximate size of a texel (a texture element) can be computed on a certain point, such that the point is on the bounding cube of the node, and the point is closest to notional camera. If the size of the texel is small enough when projected onto the screen, the node can be considered to be at the desired LOD. If the node is at the desired LOD, the 'yes' branch is taken to block 166, and the node is marked for use in subsequent rendering (e.g., by being added to the render list). Another node may be selected for evaluation at block 164 following block 166.

If, at block 156, it determined that the selected node does not meet the desired LOD, a child node of the most recently selected node is selected at block 158. In the instance where the spatial tree data structure is an octree, and there are eight children, a child node closest to the camera may be selected first, and subsequent child nodes may be visited in the order from closest to the camera to farthest from the camera. At block 160, the child node may be examined to see whether data is present. If data is present, the flow proceeds along the 'yes' branch to block 156, and the level of detail may be checked as described above.

When no data is present among the child nodes, or if not enough child nodes have data, the flow proceeds along the 'no' branch from block 160 to block 168, and the previously selected parent node is marked for use in subsequent rendering (even though this node is not at the desired LOD). The use of this type of node at coarser LOD than meets the requirements of the particular zoom level introduces the need for image space manipulations.

When, at block 164, all nodes have been processed and the most suitable nodes available have been marked for inclusion into, or exclusion from, the render list, the process proceeds to block 170 and then to block 172. At blocks 170 and 172, the render list is processed in a first pass and a second pass. At least some of the actions associated with blocks 170 and 172 are also discussed below with reference to blocks 122 and 124 of FIG. 1.

Returning to FIG. 1, when all nodes are processed and the selection of nodes is complete, image rendering may be performed in two passes. At block 122, a first rendering pass is performed, during which the selected nodes are rendered to textures using z-buffering to develop occlusions within nodes and to place the nodes in a front-to-back order. Alpha values may be set to 1 to make a texture visible or to 0 to allow features farther from the notional camera to be visible through nodes closer to the camera. In an embodiment, the nodes may be rendered as rectangles, but other shapes may also be used. Thus, at the end of the first pass of rendering, occlusions within nodes are accounted for and the nodes are in front-to-back order.

At block 124, a second rendering pass is performed using the results of texturing generated during the first rendering pass. Nodes that are at a coarser (lower) LOD than desired may be processed with image space manipulation during the second pass. One such image space manipulation technique is blurring, which softens edges and colors so that the lack of detail is less obvious to the eye. Rendering the textured nodes in a back-to-front order preserves occlusions and alpha values developed in the first pass and avoids undesired artifacts caused by blurring or other image space manipulations that cause blurred nodes to improperly occlude other nodes. In particular, the alpha channels computed during the first rendering pass are used for alpha blending to make sure the meshes in nodes show through at the proper locations. It is noted that, without the techniques of the present disclosure, a blurred node may cover an area that should be visible. Another possibility is that a blurred texture with an alpha value set to 0 improperly shows elements that should have been occluded. Rendering examples are illustrated in FIGS. 3A-4B and are discussed below.

During the second rendering pass, no z-buffering is necessary. However, when the 3D mesh data includes roads, labels, and other elements that overlay a mesh, additional processing of z-values can take place at block 124. In these cases, an image space manipulation technique should be selected in view of the image operation performed on the pixels. For example, if the pixels were blurred, image space manipulation at block 124 may include taking the nearest depth of all pixels that were blurred into each pixel.

With continued reference to FIG. 2, 3D images are be presented on an output device 56 via the mapping application at block 124. However, the 3D images in general may represent objects other than geographic entities, and may be presented in applications other than mapping applications.

Rendering Examples

Figure 3A:
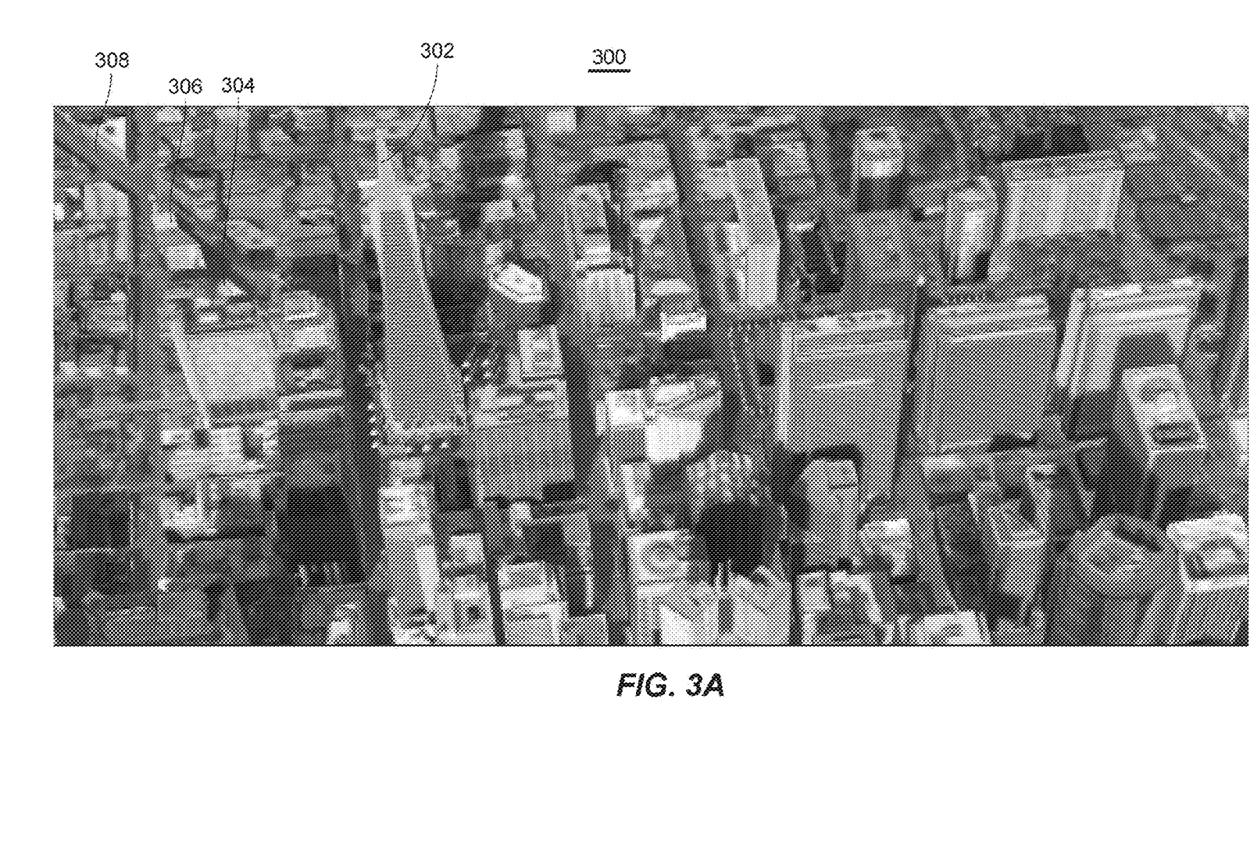
FIG. 3A is an example screenshot showing an image with a full dataset for the given LOD.
Figure 3B:
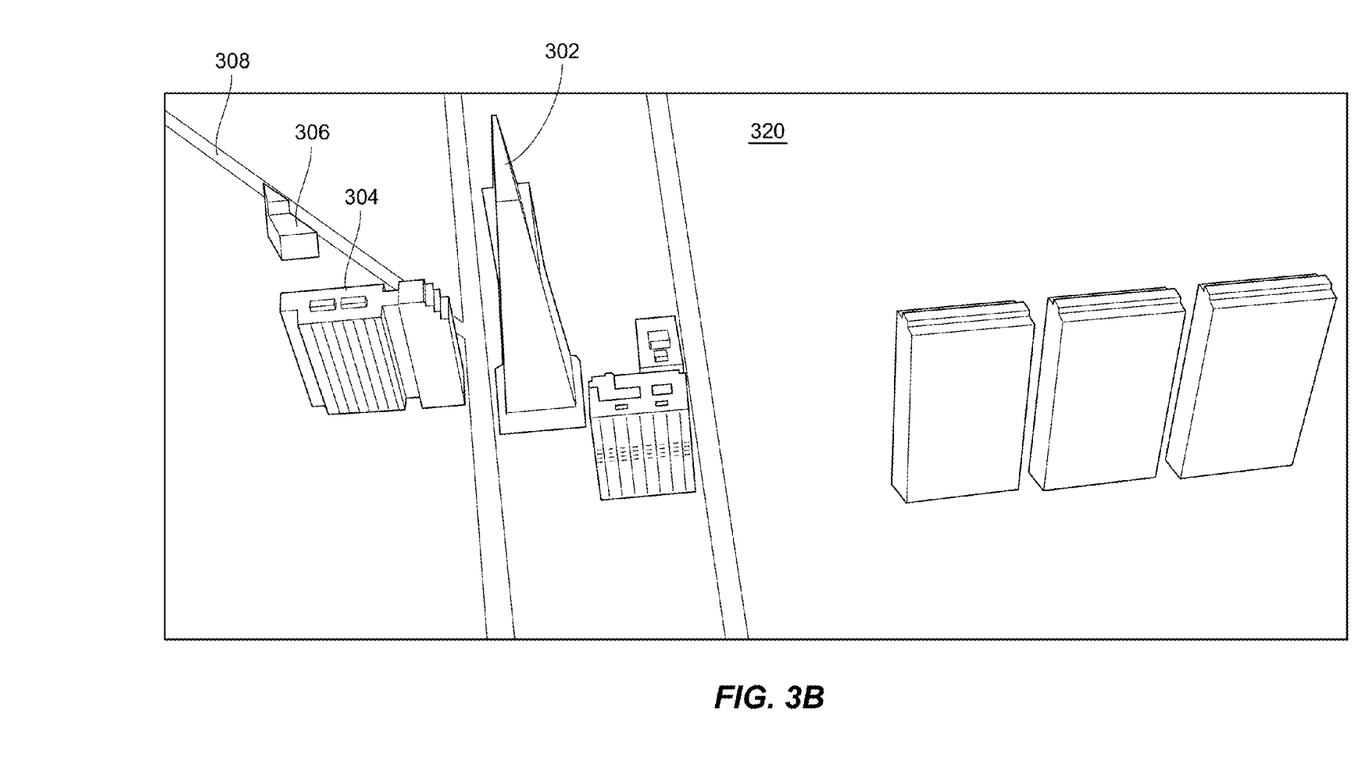
FIG. 3B is a schematic depiction of a portion of the screenshot of FIG. 3A.

For further clarity, FIG. 3A is a 3D image 300 with full data for the desired LOD, and FIG. 3B illustrates several details of the image 300 as a schematic depiction 320. In FIGS. 3A and 3B, buildings 302, 304, and 306 can be seen with a clear outline and building texture. A street 308 is clearly visible between neighboring buildings.

Figure 4A:
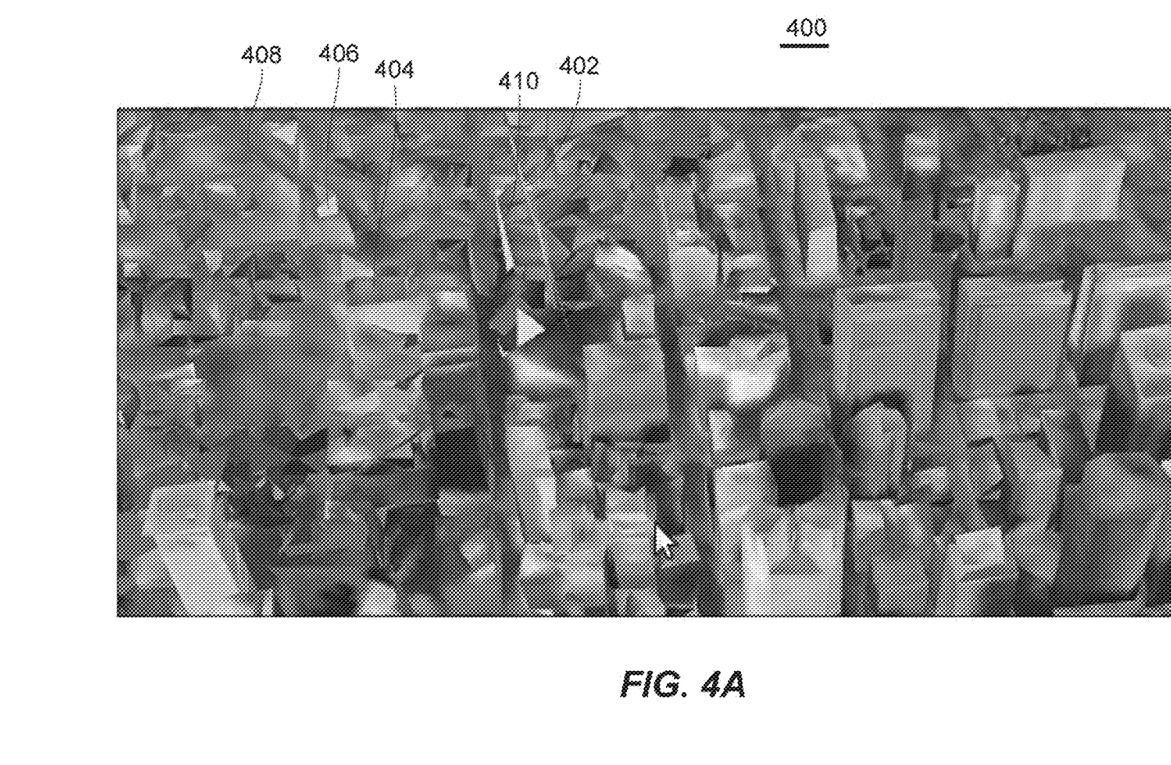
FIG. 4A is an example screenshot showing an image with an incomplete dataset for a given LOD.
Figure 4B:
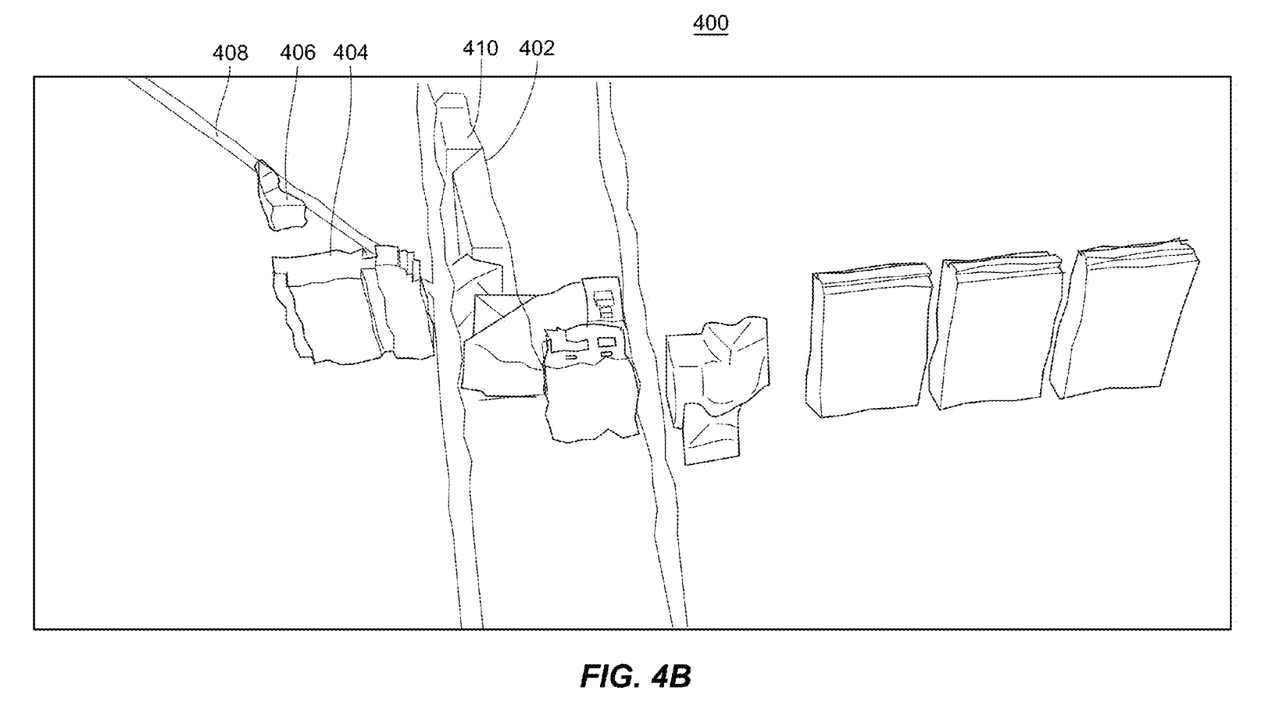
FIG. 4B is a schematic depiction of a portion of the screenshot of FIG. 4A.

By contrast, FIG. 4A is a 3D image 400 showing the effects of artifacts on 3D rendering when some or all of the data at the desired LOD is unavailable, and coarser data is used instead. FIG. 4B schematically illustrates several details of the image 400. As can be seen in these illustrations, buildings 402, 404, 406, and 410 have only sporadic data shown, some of these buildings are transparent to nodes that are farther from the camera and accordingly should be occluded. Further, the street 408 is occluded by blurring of the neighboring buildings.

Example Computing System

Figure 5:
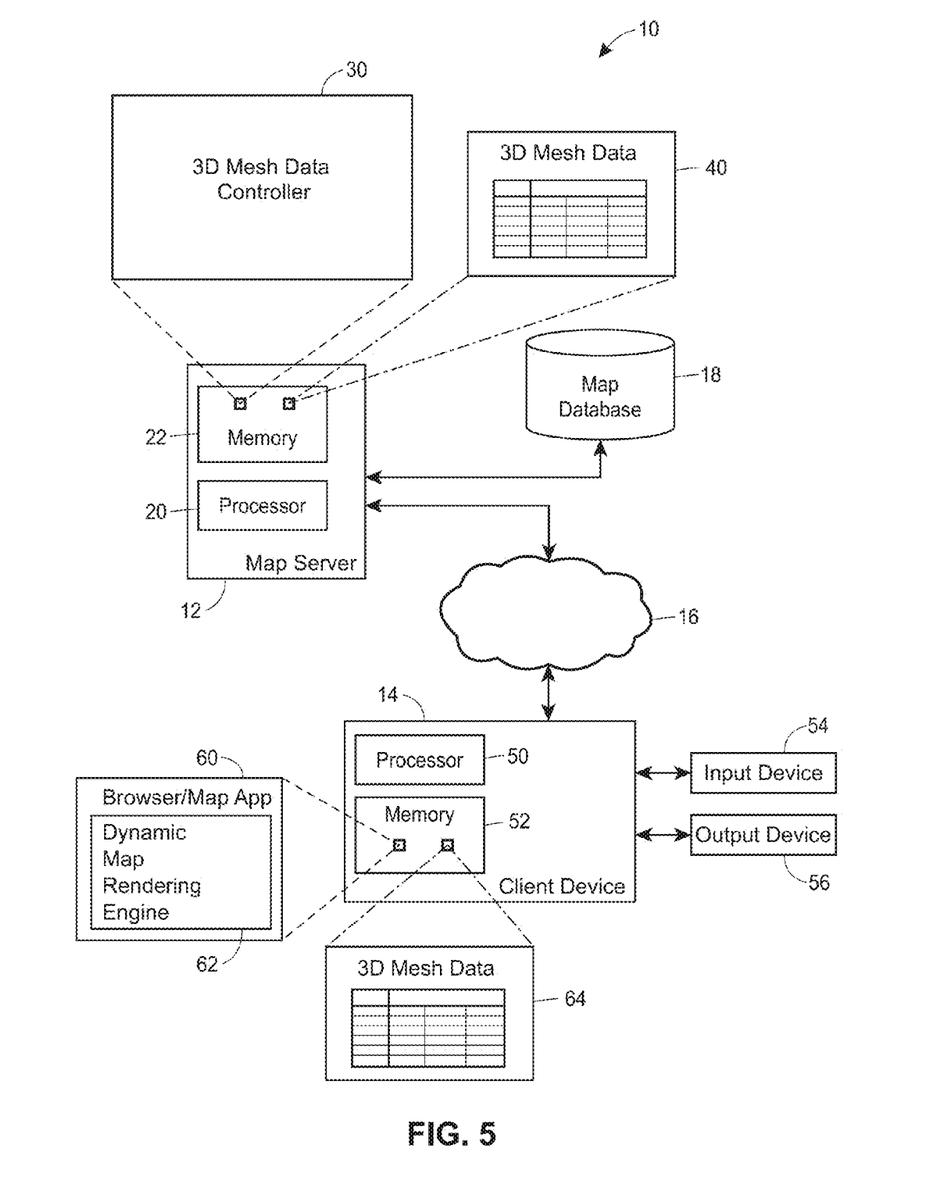
FIG. 5 is a block diagram of an example computer system that implements the techniques of the present disclosure to display a 3D image on a display screen using a real time rendering engine.

Referring to FIG. 5, an example computing system 10, in which the techniques discussed above can be implemented, includes a map server 12, a client device 14 communicatively coupled to the map server 12 via a network 16, and a map database 18 communicatively coupled to the map server 12. The network 16 may be a wide area network (WAN) such as the Internet, a local area network (LAN), or any other suitable type of a network. Depending on the embodiment, the map database 18 is coupled to the map server 12 via the network 16 or via another communication link as illustrated in FIG. 5. For simplicity, only one instance of the map server 12, the client device 14, and the map database 18 is illustrated in FIG. 5. However, in other embodiments, the system 10 may include more than one map server 12, more than one client device 14, and/or more than one map database 18.

The map server 12 may include one or more processors 20 and a computer-readable memory 22, which may include volatile memory to store computer instructions and data on which the computer instructions operate at runtime (e.g., Random Access Memory or RAM) as well as persistent memory such as a hard disk, for example. In an example implementation, the memory 22 stores a 3D mesh data controller 30 in the form of computer instructions responsible for providing mesh data to client devices upon request. The memory 22 also stores 3D mesh data 40 defining the geometries and textures of 3D models for various geographic areas.

The client device 14 may include one or more processors 50 to execute instructions and a memory 52 to store instructions and data. The client device 14 also may include an input device 54 and an output device 56 to receive input from a user and provide output to the user, respectively. The input device 54 may include one or more of a keyboard, a mouse, and a touchscreen, and the output device 56 may include a touchscreen or another type of a monitor, for example. The client device 14 may include various software components, such as device drivers, operating system (OS) event handlers, etc. to control the input device 54 and the output device 56 so as to implement an interactive user interface. Further, software applications executing on the processor 50 may utilize these software components to provide an application-specific user interface.

In one implementation, the client device 14 is a so-called thin client that depends on another computing device for certain computing and/or storage functions. For example, in one such embodiment, the memory 52 includes only volatile memory such as RAM, and a program and/or storage unit having persistent memory is external to the client device 14. In another embodiment, the memory 52 includes both volatile and persistent memory components. The memory 52 may be a physical memory having tangible storage locations embodied in physical locations using a manufacturing process and does not include propagated media.

A dynamic map rendering engine 62 may implement the methods of FIGS. 1 and 2 and/or other techniques of the present disclosure. The dynamic map rendering engine 62 may include a set of computer-readable instructions that execute on the processor 50 directly (e.g., as compiled code) or indirectly (e.g., as a script interpreted by another application executing on the processor 50). For example, in one implementation, the dynamic map rendering engine 62 is a component of a browser application 60. Alternatively, the dynamic map rendering engine 62 may be implemented as a separate application, such as a downloaded "app" developed for a smartphone. According to one example scenario, the dynamic map rendering engine 62 is downloaded when a user operating the client device 14 visits a web page that includes an embedded interactive map.

According to one implementation, the dynamic map rendering engine 62 implements image space stylization techniques of the present disclosure using WebGL instructions. For example, nodes can be rendered into textures using vertex and fragment shaders. In other implementations, the techniques are implemented using OpenGL, Direct3D, or any suitable rasterization-based rendering pipeline.

During operation, the dynamic map rendering engine 62 may receive 3D mesh data 64 in any suitable format, e.g., a format the defines vertices and textures. The dynamic map rendering engine 62 may generate and populate an octree or another spatial tree data structure as portions of the 3D mesh data 64 are received. The dynamic map rendering engine 62 then may render the data in two passes as discussed above to generate map images for display via the output device 56.

Both the client device 14, map server 12, and related equipment may incorporate computer memory that stores data in physical media and is separate from a carrier wave or other transmission media. The methods described herein may be performed using software stored in one or more such computer memories and executed on one more processors of the client device 14, map server 12 or other related hardware, such as networking equipment.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, at least some of the operations may be performed by a group of computers (as examples of machines including processors), these operations being accessible via a network (e.g., the Internet) and via one or more appropriate interfaces (e.g., application program interfaces (APIs).)

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for a system and a process for rendering information on a mobile computing device having a display screen through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a computing device for rendering a three-dimensional (3D) image, the method comprising:
    receiving mesh data stored as a plurality of nodes of a spatial tree data structure, wherein
different levels of the spatial data structure correspond to different levels of detail (LODs);
    receiving a selection of a preferred LOD;
    generating a render list sorted according to proximity to a notional camera based on the mesh data in accordance with the preferred LOD including:
        (i) not selecting a node outside a view frustum of the notional camera,
        (ii) selecting a node within a view frustum when a size of a texel associated with the node is smaller than a predetermined threshold value,
        (iii) selecting children of a node that is within a view frustum when a size of a texel associated with the node is larger than the predetermined threshold value, and
    (iv) in response to determining that a selected node is not available at the computing device, selecting a parent of the node and unselecting siblings of the node, wherein each element of the render list specifies geometry and texture of a portion of the 3D image, and wherein at least two elements of the render list correspond to the different LODs;
    in a first instance, traversing the render list to render each element in the render list to a respective texture, including applying a depth management technique to account for occlusion; and
    in a second instance, traversing the render list in a back-to-front order to render each of the textures to a display buffer to generate the 3D image, including applying an image space manipulation technique to at least some of the textures.

2. The method of claim 1, wherein applying the image space manipulation technique includes blurring.

3. The method of claim 1, wherein applying the depth management technique includes calculating a z-buffer value for the corresponding texture.

4. The method of claim 1, wherein the spatial tree data structure is an octree.

5. The method of claim 1, further comprising receiving the plurality of nodes of the spatial tree data structure at the computing device via a communication network.

6. The method of claim 1, wherein traversing the render list in the first instance includes, for each element, generating alpha channel values for geometries within the element, including (i) setting an alpha channel value for a geometry to one when the geometry is rendered, and (ii) setting the alpha channel value for the geometry to zero one when the geometry is not rendered.

7. A method for presenting a 3D image on an electronic device having a processor, a general purpose memory, a display buffer memory used to drive a display, and a user interface for receiving instructions from a user, the method comprising:
receiving, at the processor, 3D mesh data stored as a plurality of nodes of a spatial tree data structure, wherein different levels of the spatial data structure correspond to different levels of detail (LODs);
determining, using the processor, a preferred LOD for rendering the 3D image and a position of a notional camera;
selecting, using the processor, at least some of the plurality of nodes of the spatial tree data structure for rendering, wherein at least one node is at a level of detail lower than the preferred level of detail including:
(i) not selecting a node outside a view frustum of the notional camera,
(ii) selecting a node within a view frustum when a size of a texel associated with the node is smaller than a predetermined threshold value,
(iii) selecting children of a node that is within a view frustum when a size of a texel associated with the node is larger than the predetermined threshold value, and
(iv) in response to determining that a selected node is not available at the processor, selecting a parent of the node and unselecting siblings of the node;
in a first rendering operation, rendering, using the processor, each node in the selected plurality of nodes to a texture, with z-buffering, to place each textured node in a depth order; and
in a second rendering operation subsequent to the first rendering operation, rendering, using the processor, each textured node in a back-to-front order to the display buffer memory, wherein rendering each node to the display buffer memory comprises performing an image space manipulation on each node at a level of detail lower than the preferred level of detail.

8. The method of claim 7, further comprising:
receiving, via the user interface, a request to generate a 3D image of a scene corresponding to a geographic location;
sending a message to a server for three dimensional mesh data related to the request; and
receiving, from the server, the three dimensional mesh data responsive to the request.

9. The method of claim 7, further comprising storing the three dimensional mesh data as it is received in a convex octree organized having a hierarchy of LODs, wherein no node of the octree is both in front and in back of another node.

10. The method of claim 9, wherein selecting at least some of the plurality of nodes for rendering includes traversing the octree to select nodes for rendering, starting at a coarse LOD, wherein the traversing the octree includes:
(i) removing nodes outside the view frustum of the notional camera,
(ii) determining whether a parent node has an LOD that meets the preferred LOD,
(iii) selecting the parent node when its LOD meets the preferred LOD,
(iv) when the parent node does not meet the preferred LOD, visiting each child node of the parent node in an order of nearest to the notional camera to farthest from the notional camera,
(v) at each child node, determining whether data is available,
(vi) when no data is present at the child node, selecting the parent node for use in rendering,
(vii) when data is present at each child node, selecting the child nodes for use in rendering, and
(viii) repeating steps (i) through (vii) until the octree is traversed.

11. The method of claim 7, wherein the first rendering operation further comprises:
setting alpha values for geometries within a node; and
storing each alpha value in a texture for its corresponding node.

12. The method of claim 7, wherein determining the preferred LOD includes receiving, via the user interface, a zoom level selection at which to display the 3D image.

13. A computing device comprising:
one or more processors;
a network interface to send and receive data via a communication network;
a user interface configured to display images and receive user input; and
a computer-readable storage medium coupled to the processor, the computer-readable storage medium storing instructions rendering a 3D representation of a scene for a specified viewpoint and a preferred LOD, that, when executed on the one or more processors, cause the computing device to:
receive 3D mesh data stored as a plurality of nodes of a spatial tree data structure, wherein different levels of the spatial data structure correspond to different levels of detail (LODs),
receive a selection of the preferred LOD,
generate a render list sorted according to proximity to a notional camera based on the mesh data in accordance with the preferred LOD including:
(i) not selecting a node outside a view frustum of the notional camera,
(ii) selecting a node within a view frustum when a size of a texel associated with the node is smaller than a predetermined threshold value,
(iii) selecting children of a node that is within a view frustum when a size of a texel associated with the node is larger than the predetermined threshold value, and
(iv) in response to determining that a selected node is not available at the one or more processors, selecting a parent of the node and unselecting siblings of the node,
wherein each element of the render list specifies geometry and texture of a portion of the 3D representation, and wherein at least two elements of the render list correspond to the different LODs,
in a first instance, traverse the render list to render each element in the render list to a respective texture, including apply a depth management technique to account for occlusion,
in a second instance, traverse the render list in a back-to-front order to render each of the textures to a display buffer, including apply an image space manipulation technique to at least some of the textures, to generate the 3D representation of the scene.

14. The computing device of claim 13, wherein the instructions, when executed on the one or more processors, further cause the computing device to:

receive, via the user interface, a request to generate a 3D representation of a scene corresponding to a selected geographic location, where the request indicates a viewpoint and a preferred LOD, transmit, via the network interface, a request to a server for the 3D mesh data related to the request, and receive, from the server via the network interface, the 3D mesh data in an order of lower LOD to higher LOD.

15. The computing device of claim 13, wherein the three dimensional mesh data is stored as an octree.

16. The computing device of claim 13, wherein the image space manipulation technique is blurring.

17. The computing device of claim 13, wherein the image space manipulation is performed on a lower LOD geometry than the preferred LOD.

18. The computing device of claim 13, wherein in the first instance, the instructions cause the computing device to traverse the render list in a front-to-back order.

* * * * *